INVENTOR
ALFRED BOUSFIELD
BY
Henry Sherman
ATTORNEY

May 27, 1930.  A. BOUSFIELD  1,759,884
PLATFORM SCALE
Filed April 28, 1927  6 Sheets-Sheet 2
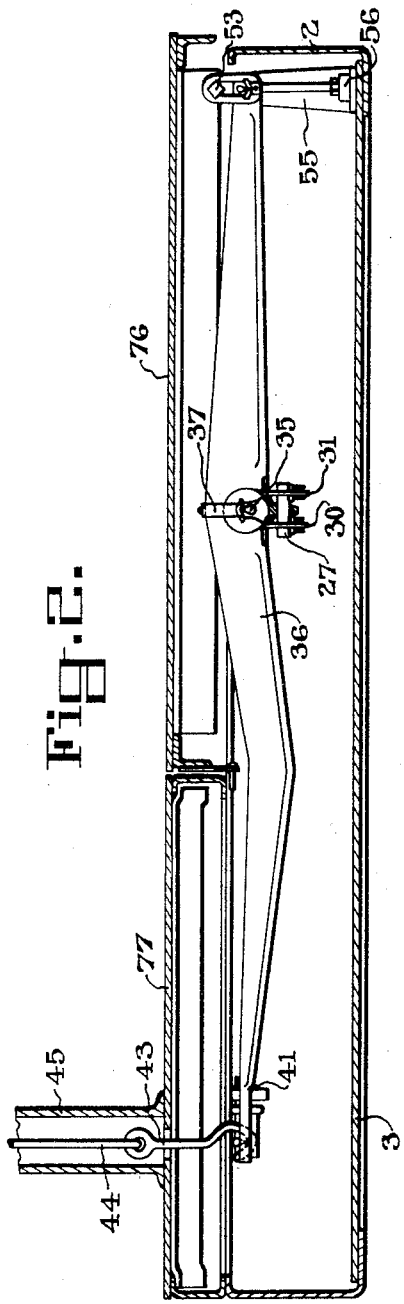
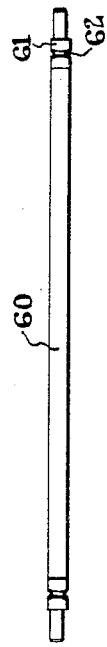
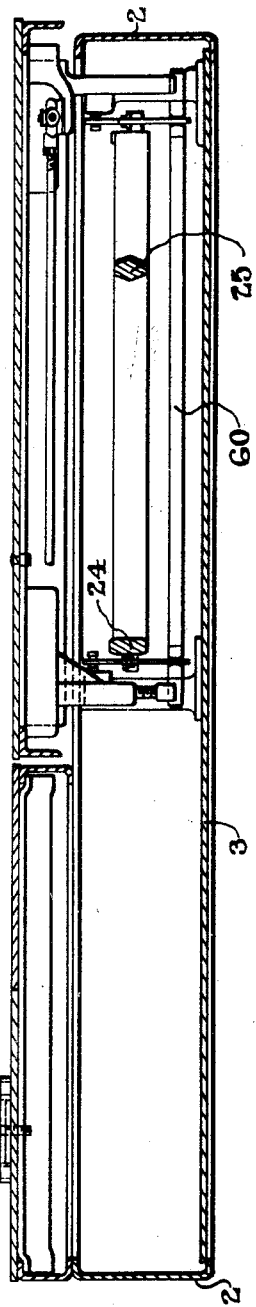
INVENTOR
ALFRED BOUSFIELD
BY
ATTORNEY

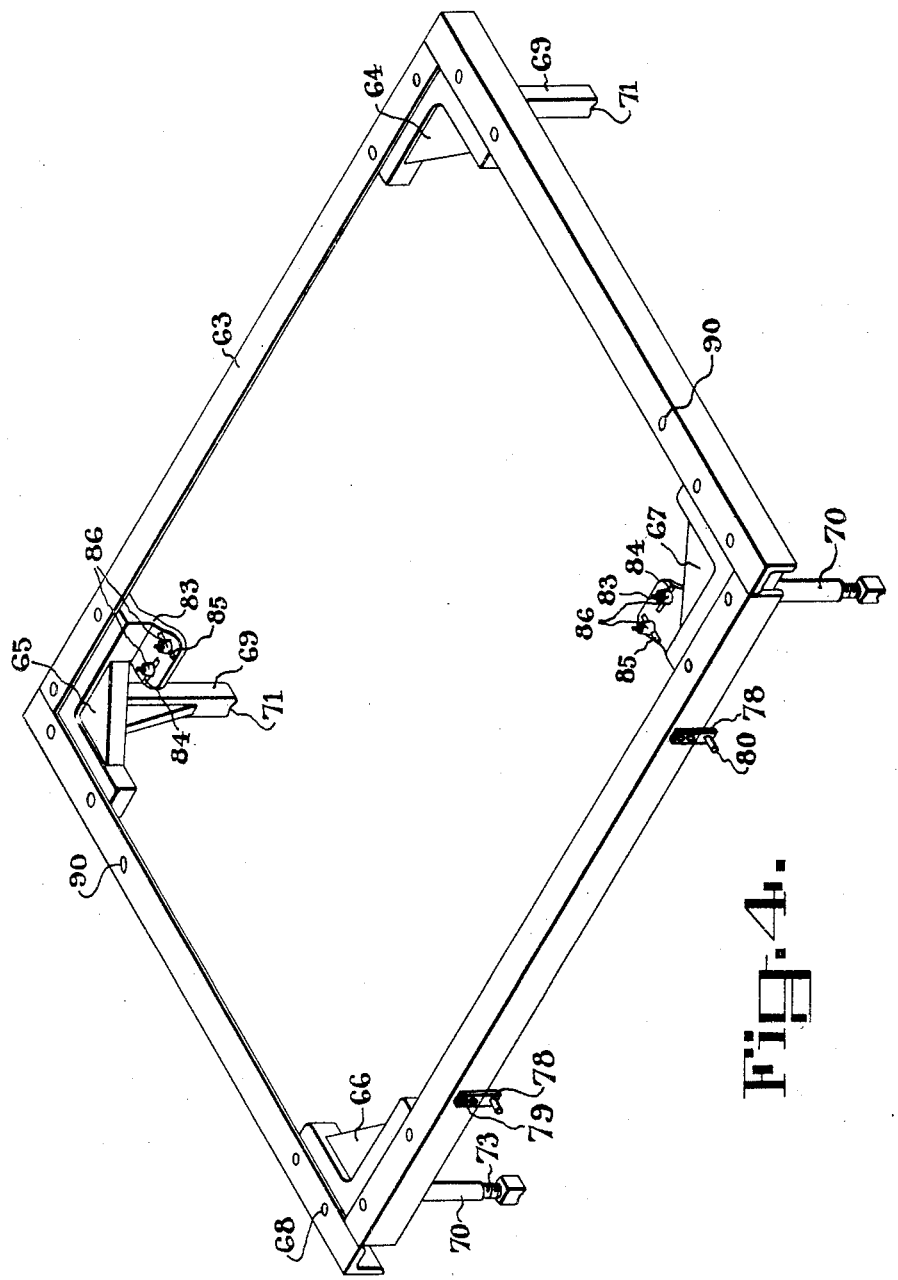

May 27, 1930. A. BOUSFIELD 1,759,884
PLATFORM SCALE
Filed April 28, 1927 6 Sheets-Sheet 4
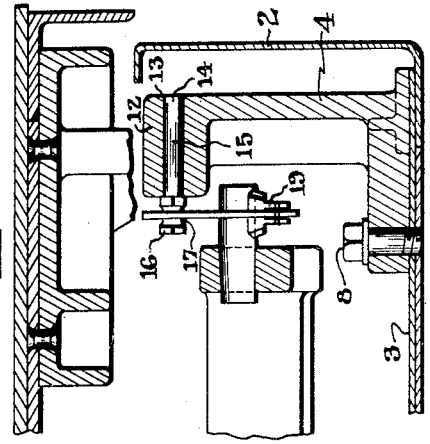
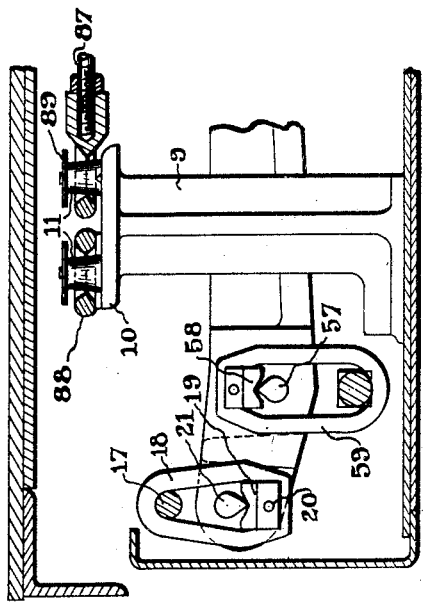
INVENTOR
ALFRED BOUSFIELD
BY
Henry Sherman
ATTORNEY

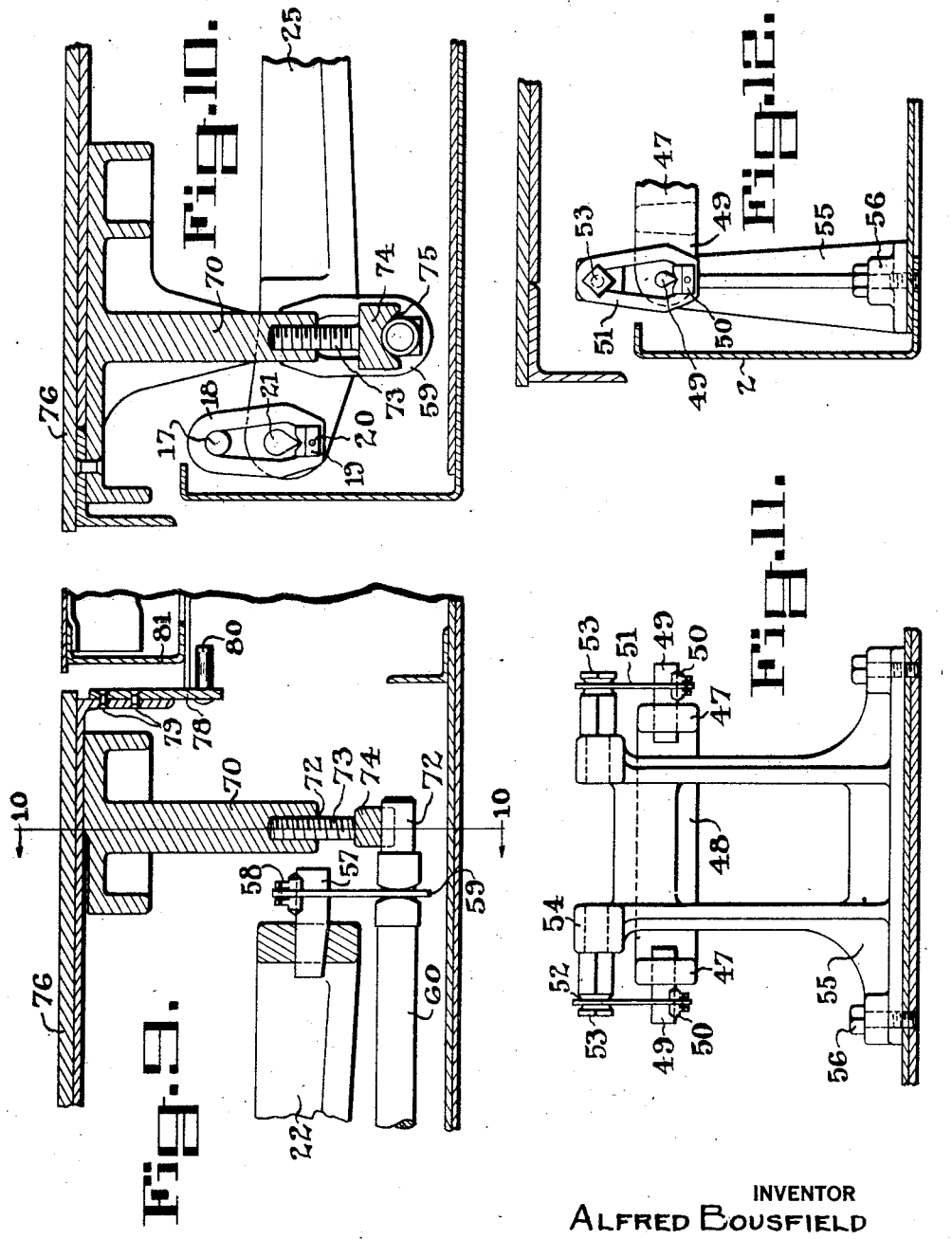

INVENTOR
ALFRED BOUSFIELD
BY
ATTORNEY

Patented May 27, 1930

1,759,884

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

PLATFORM SCALE

Application filed April 28, 1927. Serial No. 187,221.

This invention relates to scales, and more particularly to platform scales of the type known as dormant scales, wherein a base housing is employed for the reception of the platform levers and supports with a connection extending into the neck of said base and thence up to a suitable counterbalancing mechanism located above the level of the base.

In the illustrated preferred embodiment, the invention is shown applied to dormant scales of the double suspension type, wherein not only the levers are suspended, but also the platform is suspended below the load pivots and wherein the legs of the platform spider rest on cross bars suspended by loops from the load pivots of the main levers. This construction gives the effect of a long suspension and precludes the possibility of the pivots and bearings changing their relative positions in the scale organization.

An important object of this invention is the provision of an improved means for supporting the loop on which the scale levers are pivoted, the construction and arrangement being preferably such that the loop will be retained in position on its support.

Another important object of this invention is to provide an improved construction for the platform spider wherein is embodied a combination angle iron and cast corner construction which results in a spider of lighter weight without the sacrifice of strength and rigidity.

It is a further object of this invention to provide an improved connection between the main levers and the transverse extension lever which includes an improved loop design and a clip for retaining in position the bearings supporting the tip pivots of the main levers.

Other important features reside in the improved suspension bearing and support for the platform spider and also in a means for retaining the platform in position on the spider.

Other objects and advantages of this invention will be apparent from the following detailed description and will be pointed out in the appended claims.

In the drawings;

Figure 2 is a longitudinal sectional view taken on line 2—2 in Figure 1 in the direction of the arrows;

Figure 3 is a longitudinal sectional view of the scale taken on line 3—3 in Figure 1 in the direction of the arrows;

Figure 4 is a view of the spider showing the details of its construction;

Figure 5 is a cross-sectional elevation taken on line 5—5 in Figure 1;

Figure 6 is a cross-sectional elevation taken on line 6—6 in Figure 1;

Figure 7 is a perspective elevation showing the details of the double suspension construction;

Figure 8 is a cross-sectional elevation also showing the details of the double suspension construction;

Figure 9 is a cross-sectional elevation showing the adjustable foot construction and the means for preventing longitudinal tipping of platform;

Figure 10 is vertical cross-section taken on line 10—10 in Figure 9;

Figure 11 is a detail view of the extension lever fulcrum stand showing method of suspending the butt of the extension lever;

Figure 12 is a vertical cross-sectional view taken on line 12—12 in Figure 1;

Figure 15 is a detail view showing the construction of the side rod.

Figure 1:
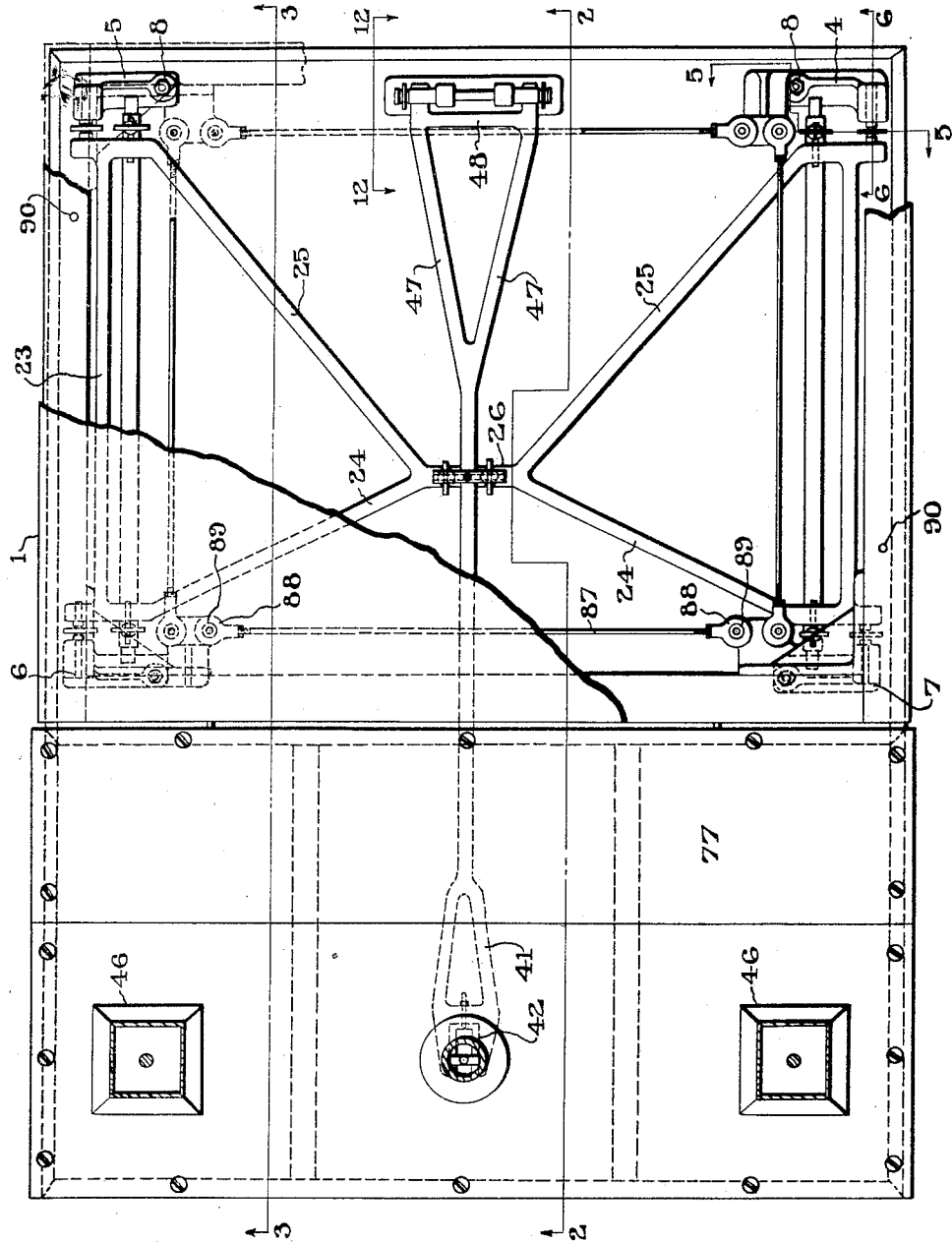
Figure 1 is a plan view of the base of the scale with the platform partly broken away for the purpose of showing the lever system.

Referring to the drawings for a detailed description of my invention, the scale base generally indicated by reference numeral 1 comprises side and end members 2 of channel formation, the flanges of which are inturned. The side and end channel members are secured to each other by any suitable means, as by welding and a sheet metal plate or floor 3 is welded to the lower flanges of the channel members forming the bottom of the base.

Located in the four corners of the base are the main lever fulcrum stands 4, 5, 6 and 7 suitably attached to the base, as by means of bolts 8. The fulcrum stands are preferably heavy castings. The stands 4 and 6 have integral therewith offset brackets 9 having flat portions, or shelves, 10 parallel to the plane of the bottom plate of the scale on which are seated the lugs 11, the purpose of which will hereinafter be set forth.

The lever fulcrum stands comprise a boss 12 extending parallel to the side walls of the base, said boss being provided with a circular opening 13 extending longitudinally therethrough into which is force-fitted the reduced portion 14, circular in cross-section, of a pin 15. The pin has a head 16 square in cross-section which is reduced at 17 to form a bearing for a loop 18.

As shown in Figure 5 this loop has a tapered opening, the constricted portion being near the top of the loop. It will be noted that the head 16 of the pin 15 is turned in such a manner as to have two apices lying in the same vertical plane, thus forming a retaining means for the constricted portion of loop 18.

In the bottom of the loop 18 is seated a V-shaped bearing plate 19, said plate being pivoted on pin 20. This construction forms a compensating bearing on which is fulcrumed the knife-edge pivots 21 set into the butt end of main lever 22. The main lever 23 is substantially similar to main lever 22.

The main levers are preferably of cast metal substantially triangular in form, the sides 24 and 25 converging to form tips 26 in which are mounted the knife-edge pivots 27, which are pivoted on compensating bearings 28 and 29 pivotally seated in loops 30 and 31, respectively, of link 32.

Figure 13:
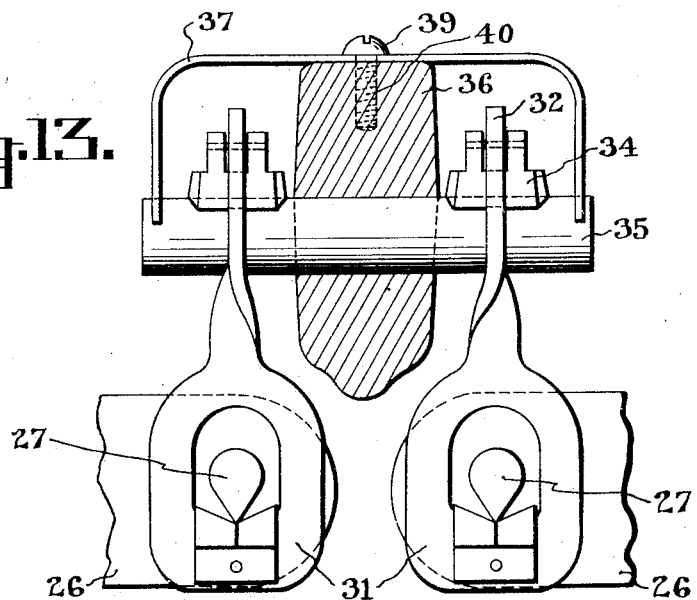
Figure 13 is a detail view partly in section of the manner in which the tip pivots of the main levers are connected to the extension lever.
Figure 14:
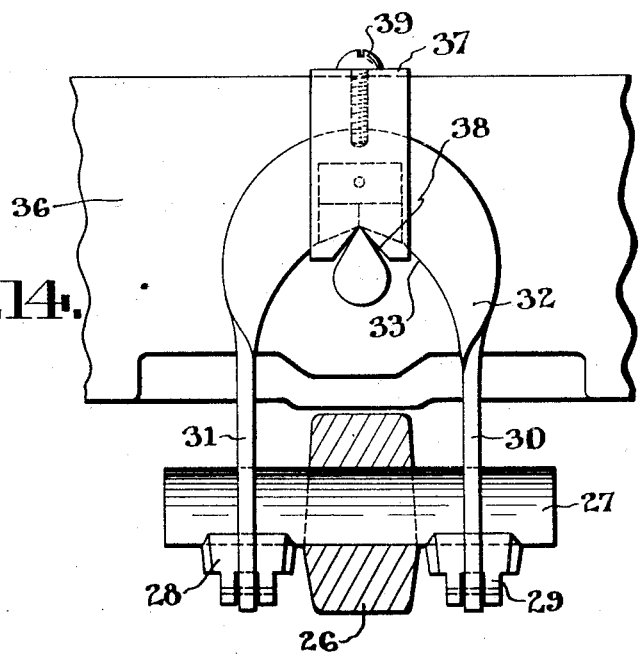
Figure 14 is a side view of the same.

The links 32 are formed from a flat piece of metal having a U-shaped portion 33 and two loops 30 and 31, the loops being twisted relative to the U-shaped portion, through an angle of ninety degrees. In the U-shaped portion, of link 32, is pivoted a compensating bearing 34 which is adapted to bear on a knife-edge pivot 35 extending through a transverse extension lever 36, as is shown in Figure 13. The two main levers are similarly suspended from pivot 35. A clip 37 having notched ends 38 which are adapted to fit over the knife-edge of the pivot 35, retains the links 32 in position upon the pivot 35. The clip is attached to the extension lever 36 by any suitable means, as by a screw 39 adapted to be received in a threaded aperture 40 extending vertically through the extension lever.

The extension lever is provided beyond the center connection, just described, with a tip 41 to which is adjustably secured a nose-iron 42 suitably connected to the counter-balancing organization (not shown) by means of a steelyard hook 43 and steelyard rod 44 extending upwardly through tube 45. The counterbalancing organization is supported on pillars 46, as is well understood in the art. In the illustrated embodiment of my invention, the pillars are preferably made of sheet metal.

The butt end of the extension lever 36 is bifurcated to form two divergent arms 47, 47, connected by a crosspiece 48. This construction of the butt end of the extension lever provides a wide bearing thus eliminating any possibility of the tipping of this lever regardless of where the load to be weighed is placed on the platform. In the ends of arms 47 are set the knife-edge pivots 49 supported on compensating bearings 50 seated in loops 51 suitably fulcrumed on reduced portions 52 formed in pins 53. It is to be understood that the loops 51 and the pins 53 are substantially similar in construction to loops 18 and pins 15, respectively. The pins 53 are force-fitted into apertures 54 in fulcrum stand 55 attached to bottom plate 3 in the front part of the base substantially centrally thereof and is secured thereto by means of screw bolts 56.

In the butt end of the main levers are set the pivots 57 on which rest the compensating bearings 58 pivotally attached to a loop 59. Suspended from the load pivots 57 by means of the loops 59 are the side rods 60 which are cylindrical in form and adjacent the ends thereof are formed integral therewith portions 61 square in cross-section.

In these portions 61 are ground substantially centrally thereof grooves 62 which are circular in cross-section and which are adapted to act as bearing grooves for the loops 59. This construction is adapted to retain the loops 59 in alignment and a fixed distance apart and this alignment will be maintained irrespective of severe usage or wear.

The side rods 60 are adapted to support thereon a platform spider generally indicated by reference numeral 63. In the present invention, the sides of the spider are formed of angle iron and are joined at their ends by castings 64, 65, 66 and 67 riveted thereto as shown at 68, (Figure 4). This construction provides a spider which while lighter in weight than those heretofore commonly employed, is of substantially the same strength and rigidity.

The cast corners not only serve to strengthen the spider, but also serves as parts to which are integrally attached the legs 69 and the legs 70. The legs 69 have grooves 71 at the ends thereof, which rest upon the end portions 72 of the side rods 60. The legs 70 are adjustable as shown in Figures 4, 9 and 10, the legs 70 are apertured at 72 to receive a screw-threaded post 73 which is integral with a foot 74 which is also grooved as is shown at 75 to rest on the end 72 of side bar 60. This vertical adjustability of legs 70 performs a two-fold function in the scale organization; that of giving a four-point bearing to the spider legs on the side rods and that of maintaining the surface of the platform 76 in the same plane as that of the neck plate 77.

As shown in Figures 4 and 9, the rear side of the platform spider has two brackets 78 secured thereto as by rivets 79, the studs 80 being riveted to said brackets at right angles thereto. These studs are adapted to be located underneath the neck frame 81 for the purpose of maintaining the spider in position and for preventing the platform from tipping when a load is placed too near the front edge thereof.

The corner castings 65 and 67 have formed integral therewith shelves 83 having the anti-friction elements 84 and 85 therein substantially at right angles to each other. The lugs 86 are mounted to rest on the anti-friction elements 84 and 85.

The checking system preferably includes check rods 87 having check rod eyes 88 at either extremity, which are adapted to fit over lugs 11 and 86, as is well understood in the art. The disk washers 89 are suitably attached to the lugs 11 and 86 in order to retain the check rod eyes in position upon the lugs.

The spider has apertures 90 in the side angle iron which are adapted to loosely receive the lugs 91 riveted to the platform. This construction enables the platform to be accurately positioned on the spider and retained in place thereon.

Having described my invention, what I claim as new and desire to secure by Letters Patent of the United States, is:

1. In a device of the character described, in combination, a base, a plurality of fulcrum stands mounted in said base, pins secured to said fulcrum stands, loops pivoted on said pins and lever supporting means suspended from said loops, said pins having means thereon to prevent the disengagement of said loops.

2. In a device of the character described, in combination, a base, a plurality of fulcrum stands mounted in said base, pins secured to said fulcrum stands, said pins having a portion thereof square in cross-section, and lever supporting means suspended from said pins.

3. In a device of the character described, in combination, a base, a plurality of fulcrum stands mounted in said base, pins secured to said fulcrum stands, said pins comprising a head square in cross-section having a groove therein and lever supporting means suspended from said head, said groove being adapted for the reception of said lever supporting means.

4. In a device of the character described, in combination, a base, a plurality of fulcrum stands mounted in said base, pins secured to said fulcrum stands, said pins comprising a head square in cross-section having a groove circular in cross-section formed therein and lever supporting means suspended from said head, said groove being adapted for the reception of said lever supporting means.

5. In a device of the character described, the combination with a base having a plurality of fulcrum stands mounted therein, loops suspended from said stand and levers pivoted in said loops, of a means for retaining said loops in position comprising a pin having a head square in cross-section, a corner of said head being in vertical alignment with the axis of said pin.

6. In a device of the character described, in combination with a base having a plurality of fulcrum stands mounted therein and levers fulcrumed on said stands, of a rod suspended from said levers and having adjacent the ends thereof portions square in cross-section and a spider supported on said rod.

7. In a device of the character described, the combination with a base having a plurality of fulcrum stands mounted therein and levers fulcrumed on said stands, of a cylindrical rod suspended from said levers and having adjacent the ends thereof portions square in cross-section, said portions having grooves therein and a spider supported on said cylindrical rod.

8. In a device of the character described, the combination with a base having a plurality of fulcrum stands mounted therein, and levers fulcrumed on said stands, of a spider supported by said levers comprising a frame having angle iron sides connected at the ends thereof by iron castings.

9. In a device of the character described the combination with a base having a plurality of fulcrum stands mounted therein, levers fulcrumed on said stands, including a main lever and an extension lever, of a connection between said levers comprising a link having a U-shaped portion and a plurality of loops at right angles to the plane of the U-shaped portion.

10. In a device of the character described, the combination with a base having a plurality of fulcrum stands mounted therein, levers fulcrumed on said stands, including a plurality of main levers and an extension lever, of a connection therebetween comprising a link having a U-shaped portion and a plurality of loops at right angles to the plane of said U-shaped portion.

11. In a device of the character described, the combination with a base having a plurality of fulcrum stands mounted therein, a main lever and an extension lever fulcrumed on said stands and a connection between said levers, of a means for retaining said connection in position comprising a clip secured to the extension lever.

12. In a device of the character described, the combination with a plurality of fulcrum stands, levers fulcrumed thereon, and a connection between said levers, of a means for retaining said connection in position comprising a clip having grooves in the ends thereof.

13. In a device of the character described, a transverse extension lever having a tip portion adjustably holding a nose iron and a butt portion bifurcated to form two divergent arms, said arms being joined adjacent the greatest divergence thereof by a cross-piece.

14. In a device of the character described, the combination with a main lever, of an extension lever connected thereto, said extension lever having a tip portion and a butt portion, said butt portion being bifurcated to form divergent arms and a stand on which said arms are fulcrumed.

In testimony whereof I have signed my name to this specification.

ALFRED BOUSFIELD.